United States Patent Office 3,769,352
Patented Oct. 30, 1973

3,769,352
PREPARATION OF UNSATURATED
ALCOHOLS AND ETHERS
Michael G. Romanelli, New York, N.Y., assignor to Esso
Research and Engineering Company
No Drawing. Continuation-in-part of application Ser. No.
808,673, Mar. 19, 1969, now Patent No. 3,670,032.
This application Feb. 8, 1971, Ser. No. 113,591
The portion of the term of the patent subsequent to
June 13, 1989, has been disclaimed
Int. Cl. C07c 41/06, 41/10
U.S. Cl. 260—614 AA          8 Claims

ABSTRACT OF THE DISCLOSURE

Unsaturated alcohols and ethers are prepared through the reaction of $C_4$ to $C_6$ aliphatic conjugated diolefins with water, a lower alkanol or mixtures thereof in the presence of a zero valent palladium based catalyst system. The preferred catalyst is tetrakis(tribenzylphosphine) palladium, tetrakis(diphenylalkylphosphine)palladium or tetrakis(triphenylphosphine)palladium alone or in combination with a basic material such as a quaternary ammonium hydroxide. Where one of the coreactants is water, the reaction is conducted in the presence of a solvent. The unsaturated alcohol and ether products can be catalytically hydrogenated to plasticizer alcohols and ether solvent media.

BACKGROUND OF THE INVENTION

(I) Field of the invention

This is a continuation-in-part application of U.S. Ser. No. 808,673, now U.S. Pat. No. 3,670,032.

This invention relates to a process for the formation of unsaturated alcohols and ethers. More particularly, this invention relates to the preparation of unsaturated aliphatic alcohols and ethers through the liquid phase reaction of aliphatic conjugated diolefins with water, aliphatic alcohols or mixtures thereof in the presence of a zero valent palladium based catalyst system.

(II) Description of the prior art

Unsaturated aliphatic alcohols and ethers are well known articles of commerce and have been prepared utilizing a variety of techniques. One previously proposed method for the preparation of lower alkyl ethers involved the catalyzed dimerization of butadiene in the presence of a lower alkyl alcohol (see Takahasi. Tetrahedron Letters, p. 2451 (1967)). The catalysts suggested for use were tetrakis(triphenylphosphine) palladium and bis(triphenylphosphine)palladium maleic anhydride adduct. While the catalyst system served to promote the reaction to the desired ether products, the yields were relatively small based upon the amount of palaldium employed.

SUMMARY OF THE INVENTION

Now, in accordance with the present invention, it has been found that both unsaturated alcohols and unsaturated ethers can be readily formed through the catalyzed dimerization of conjugated aliphatic diolefins in the presence of water, a lower alkyl alcohol, or mixtures thereof. The reaction is conducted in the liquid phase; normally in the presence of a reaction diluent. Most preferably, the reaction system is homogeneous and the reaction is conducted at a temperature less than about 160° C. in the substantial absence of oxygen. The preferred catalysts are tetrakis(tribenzylphosphine)palladium, tetrakis(diphenylalkylphosphine)palladium or tetrakis(triphenylphosphine) palladium alone or in combination with a basic cocatalyst.

The manner in which the reactions proceed is demonstrated in the following representative equations:

(I) 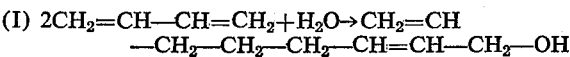

(II) 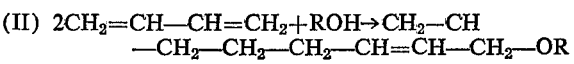

Equation I illustrates the reaction of two moles of butadiene with water to form 1-octa-2,7-dienol. Equation II illustrates the reaction of two moles of butadiene with a monoalcohol to form the corresponding octadienyl ether. In addition to the major products, minor amounts of byproducts including butadiene dimers such as 1,3,7-octatriene are also formed. The starting olefin is preferably a $C_4$ to $C_6$ conjugated diolefinic hydrocarbon. Examples of useful olefin materials include acyclic materials such as butadiene, isoprene and piperylene.

When an alcohol is employed as a coreactant, it is preferred that the alcohol be a lower acyclic or alicyclic monoalcohol having the general formula ROH wherein R designates a monovalent straight chain, branched chain or cyclic alkyl radical having from 1 to 8, preferably 1 to 5, carbon atoms. The reaction rate varies markedly with the type of alcohol coreactant used. For example, reactions wherein a straight chain alkanol, e.g., ethanol or methanol, is used proceed in a rapid fashion; however, when the alcohol is a branched chain material, such as tertiary butyl alcohol, the reaction proceeds relatively slowly. The palladium based catalyst employed is decomposed to metallic palladium when contacted with oxygen. Hence, maximum catalyst efficiency is secured when the diolefin, water and alcohol reagents are stripped prior to use to remove any dissolved oxygen. Oxygen removal can be achieved by sparging with nitrogen or other inert gas.

The instant reaction may be carried out in bulk; that is, in the absence of a solvent or in the presence of an organic diluent that does not decompose the zero valent palladium based catalyst. Reactions involving an alkyl alcohol can be carried out in the absence of a diluent in that the olefinic material is readily soluble in the alcohol and the desired homogeneous system is secured. When water is employed as the process coreactant or in situations wherein appreciable quantities of water are present within the reaction zone, a solvent system should be used because the diolefin is substantially insoluble in water. Heterogeneous reaction systems should, in general, be avoided as the complex palladium catalyst is preferentially soluble in organic materials. Hence, a reaction between a diolefin and water will not proceed at a commercially viable rate in the absence of a co-solvent for both the water and the olefin since the palladium catalyst will tend to collect in the diolefin layer.

With the exception of nitrogen-containing materials such as amines, amides, nitriles, etc., any type of material that will solubilize the diolefin and the hydroxy concontaining coreactant may be used as the process solvent. Alcohols and ethers, especially lower alkyl alcohols and ethers having from 1 to 5 carbon atoms, are the preferred reaction solvents. Most preferably, branched chain alcohols, e.g., secondary and tertiary alcohols, especially tertiary alcohols, are used because, while participating in the reaction, they do so at a relatively slow rate. Useful solvents include isopropanol, t-butanol, tetrahydrofuran, etc.

The ratio of process reactants to solvent is not critical and may vary over a wide range. Ordinarily only a sufficient quantity of solvent is used to insure the desired single phase reaction system. Typically, in a reaction system wherein water is used as a coreactant, the reaction system, before addition of diolefin, will be composed of from 15 to 50 volume percent, preferably 20 to 30 volume percent, of water with the balance of the system made up of solvent. In water-containing systems, generally about 0.5 to 2.0 moles of butadiene are used per liter of solvent. Most preferably from 1.0 to 1.5 moles of diolefin are used per liter of solvent. In systems wherein water is not used as the coreactant, the molar ratio of diolefin to alcohol within the reaction zone can vary between about 0.01:1 to 3:1, preferably 0.1:1 to 1:1.

The process is conducted in the presence of a catalyst system composed of a zero valent palladium material; that is, zero valent palladium or a material that will generate zero valent palladium at reaction conditions, a phosphine or isonitrile activator and, optionally, a basic cocatalyst material. Materials that will generate the desired zero valent palladium at reaction conditions include materials such as bis(pi-allyl)-palladium,
tetrakis(tribenzylphosphine)palladium,
tetrakis-(diphenylalkylphosphine)palladium,
tetrakis(phenyldialkylphosphine)palladium,
tetrakis(trialkylphosphine)palladium and
tetrakis(triphenylphosphine)palladium.

The activator compounds that can be employed in conjunction with the source of zero valent palladium are phosphine and isonitrile materials, preferably compositions having the general formulas:

$$R_1R_2R_3P \text{ and } R_4NC$$

wherein $R_1$, $R_2$, $R_3$ and $R_4$ are monovalent, substituted or unsubstituted organic radicals having from 1 to 20, preferably 1 to 14, carbon atoms per radical. Preferably, $R_1$, $R_2$, $R_3$ and $R_4$ are monovalent acyclic or alicyclic alkyl radicals having from 1 to 20, preferably 1 to 14 and most preferably 1 to 12 carbon atoms, such as methyl, propyl, isobutyl, cyclohexyl, etc.; phenyl radicals; monovalent alkylaryl radicals having from 7 to 12, preferably 7 to 10, carbon atoms, e.g., tolyl, xylyl, ethylphenyl, etc., and monovalent aralkyl radicals having from 7 to 12, preferably 7 to 10, carbon atoms, such as benzyl, ethylbenzyl, diethylbenzyl, etc.

Isonitrile compounds are conveniently prepared by heating a primary amine with chloroform and sodium hydroxide. The phosphine activator materials are generally prepared by reacting a phosphorous halide, e.g., phosphorous trichloride, with an alkyl or aryl organometallic compounds, such as butyl lithium, phenylmagnesium chloride, etc. Representative examples of useful activator compounds include triphenylphosphine, tricyclohexylphosphine, tributylphosphine, diethylphenylphosphine, methyldiphenylphosphine, tris(para-tolyl)phosphine, tris(metatolyl)phosphine, tris(4-methylcyclohexyl)phosphine, tris(xylyl)phosphine, triethylphosphine, tribenzylphosphine, tris(phenylethyl)phosphine, methylisonitrile, ethylisonitrile, t-butylisonitrile, cyclohexylisonitrile, phenylisonitrile, p-tolylisonitrile, etc.

The performance of the catalyst system can be greatly enhanced by using either an organic or inorganic base material in conjunction with the zero valent palladium-activator system. Preferred basic materials include quaternary ammonium hydroxides having from 4 to 20, preferably 8 to 10, carbon atoms, quaternary ammonium alkoxides having from 4 to 20, preferably 8 to 12, carbon atoms, alkali and alkaline earth metal hydroxides, and alkali and alkaline earth metal alkoxides having from 1 to 10 carbon atoms. Since the use of inorganic hydroxides normally adversely affects the solubility of the diolefin reagent within the reaction system, it is preferred that organic base materials, especially quaternary ammonium hydroxides, and alkoxides, be used as the process cocatalysts. Useful cocatalyst materials include tetraalkylammonium hydroxides, tetraalkylammonium alkoxides, alkylpyridinium hydroxides, trialkylaralkylammonium hydroxides, trialkylaralkylammonium alkoxides, alkylpyridinium alkoxides, and alkali and alkaline earth metal oxides, hydroxides, and alkoxides such as sodium, potassium and lithium methoxide, ethoxide, isopropoxide, t-butoxide, etc.

The palladium catalyst is ordinarily employed in amounts ranging from about 0.0001 to 0.01 mole of catalyst per liter of alcohol and/or solvent present within the reaction zone. In most instances, the palladium catalyst is insoluble at concentrations greater than about 0.01 mole of catalyst per liter of solvent and/or alcohol. It is preferred that about 0.001 mole of catalyst be used per liter of solvent and/or alcohol present within the reaction zone.

The concentration of the activator within the reaction zone can vary over a wide range. When a phosphine material is used, it is preferred that it be employed in molar excess relative to the zero valent palladium material. Up to about 150 moles of phosphine compound may be used per mole of zero valent palladium compound. Preferably, at least about 1 to 10 moles phosphine activator are used per mole of zero valent palladium material. When an isonitrile activator is used, it is preferred that at least about 1 mole of isonitrile compound be employed per mole of zero valent palladium material. Preferably, about 1 to 4 moles of isonitrile activator compound are used per mole of zero valent palladium compound. When large excesses of isonitrile compound are used relative to the zero valent palladium material, the reaction tends to start rapidly but then stops after a relatively brief reaction period. The source of zero valent palladium and the activator compound may be combined in a single complex or molecule, such as tetrakis(tribenzylphosphine)palladium or tetrakis(triphenylphosphine)palladium. In such situations, it is not essential that additional amount of activator be employed; however, it is ordinarily preferred to use greater than stoichiometric amounts of activator compound.

The basic cocatalyst may be used at concentrations substantially identical to or higher than the palladium catalyst concentration. At least about 0.0001 mole of base is used per liter of alcohol or solvent. The upper limit on base concentration may vary over a wide range as it is possible to use more than about 0.1 mole of base per liter of solvent or alcohol. However, the presence of a basic material adversely affects the solubility of the olefin in the reaction system. Hence, it is ordinarily desirable to maintain the base concentration at the lowest effective level consistent with a desirable reaction rate for the amount of olefin dissolved within the reaction system.

The reaction is conducted in the liquid phase at temperatures below about 160° C. Although the reaction proceeds at a much faster rate at elevated temperatures, the palladium catalyst tends to be inactivated at tempreatures much above about 160° C. Typically, the reaction is carried out at a temperature ranging between about 0° and 160° C., preferably between 50 and 140° C. The reaction pressure, that is the pressure maintained within the reaction zone, may vary over a wide range as both atmospheric and superatmospheric pressures may be used. Typically, the pressure within the raction zone is the autogenous pressure exterted by the reactants and solvent at the reaction temperature. The length of the reaction period depends upon a number of process variables. In most instances, high product yields are secured at the above described temperature and pressure conditions within about 0.1 to 60 hours. More typically, substantial product yields are secured within from 0.5 to 20 hours at the above temperature and pressure conditions.

The unsaturated alcohol and ether compounds produced according to the process of this invention have many varied uses. Principally, the compositions may be hydrogenated in the liquid phase in the presence of a typical hydrogenation catalyst such as nickel, platinum or palladium and reduced to the corresponding saturated alcohols and ethers. The alcohol product can be reacted with phthalic anhydride to form useful polyvinylchloride plasticizer materials. Additionally, the saturated alcohols can be used as ingredients in cosmetic formulations. The saturated ethers may be employed for solvent applications, particularly as constituents in paint or varnish compositions.

reacted with water in the presence of an isopropanol diluent. In each case tetrakis(triphenylphosphine)palladium was used as the catalyst. Sodium hydroxide cocatalyst was used in Run No. 2. The conditions at which each of the experiments were carried out as well as the results of the experiments are set forth in Table I below.

TABLE I $$\diagup\diagdown\diagup\diagdown + H_2O \xrightarrow[(CH_3)_2CHOH]{(Ph_3P)_4Pd}$$

$$\diagup\diagdown\diagup\diagdown\diagup\diagdown\diagup\diagdown_A + \diagup\diagdown\diagup\diagdown\diagup\diagdown\text{—OH}_B + \diagup\diagdown\diagup\diagdown\diagup\diagdown\text{OCH(CH}_3)_2{}_C + \diagup\diagdown\diagup\diagdown\diagup\diagdown\text{O}\diagup\diagdown\diagup\diagdown\diagup\diagdown_D$$

| Run No. | $(Ph_3P)_4$ Pd, g. | $\diagup\diagdown\diagup\diagdown$ g.[a] | $H_2O$, ml. | $(CH_3)_2CHOH$, ml. | Temp., °C. | Time, hrs. | Product, g. | Wt. percent A | B | C | D | Yield of B G./g. catalyst | G./g. Pd |
|---|---|---|---|---|---|---|---|---|---|---|---|---|---|
| 1 | 0.0775 | 17.1 | 40 | 120 | 60 | 21.0 | 10.9 | 16.4 | 15.4 | 60.9 | ----- | 21.8 | 236 |
| 2 | 0.0668 | 9.6 | [b]100 | 120 | 60 | 42.0 | 10.6 | 10.0 | 13.6 | 59.4 | 9.2 | 21.6 | 235 |
| 3 | 0.0899 | 14.0 | 100 | 120 | 60 | 56.0 | 5.1 | 4.8 | 17.1 | 62.7 | 0.3 | 9.7 | 106 |
| 4 | 0.0211 | 7.7 | 8 | 24 | 80 | 23.5 | 1.81 | 14.5 | 22.2 | 28.8 | 4.2 | 10.5 | 114 |
| 5 | 0.0299 | 5.2 | 20 | 24 | [c]80 | 56.0 | 3.13 | 18.2 | 17.9 | 37.3 | 8.4 | 18.7 | 203 |

[a] Initial charge—not all consumed.
[b] 2.0 ml. 50% NaOH added.
[c] Temperature not maintained during entire period.

DESCRIPTION OF THE PREFERRED EMBODIMENTS

The invention will be further understood by reference to the following examples.

Example 1

A nitrogen purged mixture consisting of 1.0147 grams of tetrakis(triphenylphosphine)palladum, 17.4 grams of butadiene, 50 milliliters of tetrahydrofuran and 10 milliliters of water were introduced into the reaction vessel of a typical Parr pressure apparatus. After addition of the catalyst, process reagents and solvents, the reaction vessel was shaken and simultaneously heated to 60° C. The reaction was continued at 60° C. for 16.5 hours. Upon completion of the reaction period, the reaction vessel was vented and the liquid contents diluted with three volumes of water. Thereafter, the organic layer was separated from the water layer and the latter extracted with pentane. The resulting pentane layer was then washed with water and then dried over magnesium sulfate. The pentane was then evaporated from the reaction product.

The resulting product (3.0 grams) was subjected to gas chromatographic, infrared and nuclear magnetic resonance spectral analysis and was found to contain 65.9 wt. percent of 1,3,7-octatriene, 7.9 wt. percent of 1-octa-2,7-dienol and 15.5 wt. percent of bis(2,7-octadienyl) ether. The unsaturated alcohol was formed at a rate of 0.233 grams of alcohol per gram of catalyst per hour and a yield of 2.52 grams of product per gram of palladium was secured.

Example 2

Following the general procedure of Example 1, a series of experiments were conducted wherein butadiene was The above data clearly indicate the effectiveness of the palladium catalyst and base in promoting the formation of both unsaturated ethers and alcohols. As shown in Table I, the major portion of the products secured from the reaction is made up of the desired unsaturated alcohols and ethers.

Example 3

Following the procedure of Example 1, a number of tests were conducted wherein butadiene was reacted with water in the presence of a tertiary butanol diluent. The catalyst employed was tetrakis(triphenylphosphine) palladium. Benzyltrimethyl ammonium hydroxide was used as cocatalyst in Run No. 2. The results of the tests and the conditions at which the experiments were carried out are set forth in Table II below.

TABLE II $$\diagup\diagdown\diagup\diagdown + H_2O \xrightarrow[(CH_3)_3COH]{(Ph_3P)_4Pd}$$

$$\diagup\diagdown\diagup\diagdown\diagup\diagdown\diagup\diagdown_A + \diagup\diagdown\diagup\diagdown\diagup\diagdown\text{—OH}_B + \diagup\diagdown\diagup\diagdown\diagup\diagdown\text{—OC(CH}_3)_3{}_C + \diagup\diagdown\diagup\diagdown\diagup\diagdown\text{O}\diagup\diagdown\diagup\diagdown\diagup\diagdown_D$$

| Run No. | $(Ph_3P)_4$ Pd, g. | $\diagup\diagdown\diagup\diagdown$ g.[a] | $H_2O$, ml. | $(CH_3)_2CHOH$, ml. | Temp., °C. | Time, hrs. | Product, g. | Wt. percent A | B | C | D | Yield of B G./g. catalyst | G./g. Pd |
|---|---|---|---|---|---|---|---|---|---|---|---|---|---|
| 1 | 0.0335 | 4.4 | 20 | 40 | 25 | 69.0 | 0.3 | 3.8 | 35.5 | 18.0 | 7.4 | 3.1 | 32.8 |
| 2 | 0.0396 | 3.8 | [b]20 | 40 | 25 | 69.0 | 1.39 | 1.6 | 19.7 | 10.9 | 18.0 | 6.9 | 74.9 |
| 3 | 0.0875 | 18.7 | 25 | 125 | 60 | 22.5 | 3.5 | 14.0 | 42.3 | 18.3 | ----- | 16.9 | 183 |
| 4 | 0.0728 | 11.1 | 50 | 100 | 60 | 3.3 | 0.3 | 10.0 | 57.2 | 19.4 | 1.4 | 2.36 | 25.6 |
| 5 | 0.0634 | 12.6 | 50 | 100 | 60 | 18.0 | 2.4 | 11.4 | 42.6 | 16.5 | 13.4 | 16.1 | 175 |
| 6 | 0.0832 | 11.8 | 100 | 100 | 60 | 90.0 | 4.4 | 12.4 | 38.9 | 12.9 | 19.0 | 20.6 | 223 |
| 7 | 0.0214 | 4.0 | 12 | 30 | 80 | 17.5 | 3.2 | 11.5 | 40.4 | 12.8 | 19.6 | 60.5 | 657 |

[a] Initial charge—not all consumed.
[b] 0.5 ml. of benzyl trimethyl ammonium hydroxide added.

The above data clearly indicate the utility of the reaction for the formation of unsaturated alcohols and ethers. As is evidenced from the data, the use of a tertiary alcohol, namely tertiary-butanol, as the reaction solvent clearly resulted in the formation of much less ether product. Using the tertiary-butanol solvent system, the selectivity of the process was greatly directed to the formation of the unsaturated alcohol. Runs 1 and 2 demonstrate the desirable effects secured with the use of a quaternary ammonium base cocatalyst. In Run 2 wherein a benzyltrimethylammonium hydroxide cocatalyst was used, the rate of formation of alcohol per gram of palladium per hour was approximately twice that secured with an identical run wherein no quaternary ammonium hydroxide was used.

Example 4

Following the general procedure of Example 1, a number of tests were conducted wherein butadiene was reacted with the various types of aliphatic monoalcohols at 80° C. In each of the tests, the catalyst employed was tetrakis(triphenylphosphine)palladium alone or in combination with benzyltrimethylammonium methoxide. The results of the test and conditions at which the experiments were carried out are set forth in Table III below.

TABLE III

| Run | Grams catalyst | Alcohol type | Milliliters alcohol | Grams butadiene | Time, hours | Grams product | Grams product/gram Pd/hr. | |
|---|---|---|---|---|---|---|---|---|
| | | | | | | | 1-octadienyl ether | 3-octadienyl ether |
| 1 | 0.0974 | Methanol | 100 | 8.7 | 1.87 | 8.20 | 460 | 22.6 |
| 2 | 0.0975 | do | ª 100 | 8.5 | 1.87 | 9.00 | 466 | 58.0 |
| 3 | 0.0484 | Ethanol | 100 | 10.3 | 3.00 | 3.40 | 212 | 8.58 |
| 4 | 0.0479 | do | ª 100 | 9.2 | 3.00 | 4.80 | 293 | 27.7 |
| 5 | 0.0419 | n-Propanol | 100 | 10.0 | 3.00 | 0.00 | | |
| 6 | 0.0480 | do | ª 100 | 10.5 | 3.00 | 8.10 | 447 | 23.2 |
| 7 | 0.0483 | n-Butanol | 100 | 10.6 | 3.00 | 2.10 | 124 | 5.51 |
| 8 | 0.0487 | do | ª 100 | 10.0 | 3.00 | 6.00 | 372 | 16.0 |
| 9 | 0.0465 | Isopropanol | 100 | 10.1 | 3.00 | 0.00 | | |
| 10 | 0.0448 | do | ª 100 | 10.5 | 3.00 | 1.00 | 447 | 23.2 |
| 11 | 0.0481 | t-Butanol | 80 | 7.3 | 17.3 | 0.00 | | |
| 12 | 0.0497 | do | ᵇ 80 | 8.0 | 19.0 | 2.79 | | |

ª 3 milliliters of a 40 wt. percent solution of benzyltrimethylammonium methoxide also added.
ᵇ 1 milliliter of 0.186 N benzyltrimethylammonium methoxide in methanol also added.

The above tests clearly point out the desirability of using a basic cocatalyst in conjunction with the general zero valent palladium/activator catalyst system. In each of the tests wherein the base material was present, higher yields of product were secured as compared with substantially identical tests wherein no base was used. As shown in Runs 9–12, the presence of the basic cocatalyst served to promote the formation of the product within relatively brief reaction times even when branched chain alkanols were used.

Example 5

A nitrogen purged mixture of tetrakis(tribenzylphosphine)-palladium, butadiene and 100 ml. of methanol were placed into a pressure bottle, stirred magnetically and heated in an oil bath. Upon completion of the reaction period, the reaction vessel was vented and the liquid contents diluted with three volumes of water. Thereafter the organic layer was separated from the water layer and the latter extracted with pentane. The combined organic and pentane layers were then washed with water and dried over magnesium sulfate. The pentane was then evaporated from the reaction product. The product was subjected to gas chromatography and the results summarized in Table IV.

TABLE IV

| | | | | | Product | | | | |
|---|---|---|---|---|---|---|---|---|---|
| | | | | | 1-methoxy-2,7-octadiene | | | 3-methoxy 1,7-octadiene | |
| Exp. | $[(C_6H_5CH_2)_3P]_4Pd$, g. | Butadiene, g. | Temp., °C. | Time, hrs. | Grams | Wt. percent | G./g. Pd/hr. | Wt. percent | G./g. Pd/hr. |
| 1 | 0.1119 | 11.0 | 100 | 0.35 | 10.85 | 92.4 | 3,180 | 7.6 | 260 |
| 2 | 0.0841 | 11.0 | 100 | 0.42 | 12.50 | 90.1 | 4,000 | 7.6 | 340 |
| 3 | 0.1221 | 12.0 | 100 | 0.28 | 13.20 | 92.6 | 4,450 | 7.3 | 350 |
| 4 | 0.1010 | 11.0 | 120 | 0.27 | 12.25 | 89.3 | 4,990 | 10.1 | 560 |
| 5 | 0.1149 | 11.0 | 120 | 0.18 | 12.60 | 91.4 | 6,920 | 8.7 | 660 |
| 6 | 0.1195 | 12.0 | 120 | 0.20 | 12.60 | 91.6 | 6,010 | 8.4 | 550 |
| 7 | 0.1057 | 11.0 | 140 | 0.15 | 11.95 | 89.6 | 8,400 | 10.2 | 960 |
| 8 | 0.1123 | 11.5 | 140 | 0.15 | 11.95 | 91.5 | 8,070 | 8.6 | 760 |
| 9 | 0.1046 | 12.0 | 140 | 0.16 | 12.65 | 91.5 | 8,600 | 8.3 | 780 |

The above tests clearly point out both the substantial activity of tetrakis(tribenzylphosphine)palladium as a catalyst, and the desirability of using as high a reaction temperature as is consistent with catalyst stability, e.g. 140° C.

Example 6

Following the general procedure of Example 5, a series of reactions were run in which the catalyst was tetrakis(diphenylalkylphosphine)palladium; $L_4Pd$ where L=diphenylalkylphosphine. The results are listed in Table V.

TABLE V

| | $L_4Pd$ catalyst | | | | | | Product | | | |
|---|---|---|---|---|---|---|---|---|---|---|
| | | | | | | | 1-methoxy-2,7-octadiene | | 3-methoxy-1,7-octadiene | |
| Exp. | L equals | Grams | Butadiene, g. | Temp., °C. | Time, hrs. | Grams | Wt. percent | G./g. Pd/hr. | Wt. percent | G./g. Pd/hr. |
| 1 | $(C_6H_5)_2PCH_3$ | 0.1827 | 12.3 | 140 | 0.25 | 11.54 | 81.5 | 1,760 | 12.5 | 270 |
| 2 | $(C_6H_5)_2PC_2H_5$ | 0.1475 | 12.0 | 140 | 0.20 | 14.48 | 82.0 | 3,500 | 11.1 | 470 |
| 3 | $(C_6H_5)_2P—nC_6H_{13}$ | 0.0879 | 10.5 | 140 | 0.25 | 10.31 | 82.1 | 4,280 | 8.3 | 430 |
| 4 | $(C_6H_5)_2P—\langle cyclohexyl \rangle$ | 0.1016 | 10.5 | 140 | 0.13 | 11.00 | 89.5 | 8,080 | 6.2 | 560 |
| 5 | $(C_6H_5)_2P—nC_{12}H_{25}$ | 0.0819 | 10.1 | 140 | 0.25 | 9.00 | 88.9 | 5,580 | 8.9 | 560 |
| 6 | $(C_6H_5)_2P—nC_{16}H_{33}$ | 0.0703 | 10.8 | 140 | 0.30 | 10.55 | 88.2 | 7,230 | 8.1 | 660 |
| 7 | $(C_6H_5)_2P—nC_{20}H_{41}$ | 0.0959 | 10.3 | 140 | 0.33 | 10.50 | 88.8 | 5,420 | 9.3 | 570 |
| 8 | $(C_6H_5)_2P—sC_4H_9$ | 0.1175 | 13.5 | 120 | 0.15 | 13.85 | 92.5 | 7,350 | 6.8 | 540 |

The above tests clearly show the substantial activity of tetrakis(diphenylalkylphosphine)palladium compounds as catalysts, and the increase in catalytic activity as the straight chain alkyl group increases in length from 1 to 16 carbon atoms. A substantial increase in catalytic activity is also obtained when the alkyl group is either cyclic, experiment 4, or branched, experiment 8.

Example 7

Following the general procedure of Example 5, a series of reactions were run in which the catalyst was tetrakis-(phenyldialkylphosphine)palladium, $L_4Pd$ where L=phenyldialkylphosphine. The results are listed in Table VI.

TABLE VI

| | L₄Pd catalyst | | Butadiene, g. | Temp., °C. | Time, hrs. | Product | | | | |
|---|---|---|---|---|---|---|---|---|---|---|
| | | | | | | 1-methoxy-2,7-octadiene | | | 3-methoxy-1,7-octadiene | |
| Exp. | L equals | Grams | | | | Grams | Wt. percent | G./g. Pd/hr. | Wt. percent | G./g. Pd/hr. |
| 1 | C₆H₅P(C₂H₅)₂ | 0.0863 | 9.5 | 140 | 0.50 | 10.41 | 72.7 | 1,190 | 13.4 | 220 |
| 2 | C₆H₅P(n-C₆H₁₃)₂ | 0.1441 | 12.6 | 140 | 0.33 | 8.00 | 87.9 | 1,640 | 7.9 | 150 |

The above tests clearly show the activity of tetra(phenyldialkylphosphine)palladium compounds as catalysts.

Example 8

Following the general procedure of Example 6, a series of reactions were run in which the catalyst was tetrakis-(trialkylphosphine)palladium, L₄Pd where L=trialkyl phosphine. The results are listed in Table VII.

TABLE VII

| | L₄Pd catalyst | | Butadiene, g. | Temp., °C. | Time, hrs. | Product | | | | |
|---|---|---|---|---|---|---|---|---|---|---|
| | | | | | | 1-methoxy-2,7-octadiene | | | 3-methoxy-1,7-octadiene | |
| Exp. | L equals | Grams | | | | Grams | Wt. percent | G./g. Pd/hr. | Wt. percent | G./g. Pd/hr. |
| 1 | P(n-C₄H₉)₃ | 0.1493 | 12.8 | 140 | 0.25 | 12.96 | 75.9 | 2,260 | 14.0 | 420 |
| 2 | P(n-C₈H₁₇)₃ | 0.1168 | 10.5 | 140 | 0.65 | 5.35 | 88.9 | 940 | 9.5 | 100 |

The above tests clearly show the activity of tetrakis-(trialkylphosphine)palladium compounds as catalysts.

What is claimed is:

1. A process for the formation of unsaturated ethers which comprises contacting a $C_4$–$C_6$ acyclic aliphatic conjugated diolefin and an alkanol having from 1 to 8 carbon atoms in a liquid phase, said liquid phase being free of dissolved oxygen, in the presence of a catalyst system comprised of tetrakis(tribenzylphosphine) palladium and a basic cocatalyst selected from the group consisting of tetraalkyl and trialkylaralkyl ammonium hydroxides and alkoxides having from 4 to 20 carbon atoms at a temperature ranging from 0 to 160° C., and thereafter recovering a yield of said unsaturated ethers.

2. The process of claim 1 wherein said conjugated diolefin is butadiene.

3. A process for the formation of unsaturated ethers which comprises contacting a $C_4$–$C_6$ acyclic aliphatic conjugated diolefin and an alkanol having from 1 to 8 carbon atoms in a liquid phase, said liquid phase being free of dissolved oxygen in the presence of a catalyst system comprised of tetrakis(diphenylalkylphosphine) palladium wherein the alkyl group is one selected from the group consisting of methyl, ethyl, n-hexyl, n-dodecyl, n-hexadecyl, n-eicosyl and sec-butyl groups and a basic cocatalyst selected from the group consisting of tetraalkyl and trialkylaralkyl ammonium hydroxides and alkoxides having from 4 to 20 carbon atoms at a temperature ranging from 0 to 160° C., and thereafter recovering a yield of said unsaturated ethers.

4. The process of claim 3 wherein said conjugated diolefin is butadiene.

5. A process for the formation of unsaturated ethers which comprises contacting a $C_4$–$C_6$ acyclic aliphatic conjugated diolefin and an alkanol having from 1 to 8 carbon atoms in a liquid phase, said liquid phase being free of dissolved oxygen in the presence of a catalyst system comprised of tetrakis(phenyldialkyl phosphine) palladium wherein the alkyl is selected from the group consisting of ethyl and n-hexyl groups and a basic catalyst selected from the group consisting of tetraalkyl and trialkylaralkyl ammonium hydroxides and alkoxides having from 4 to 20 carbon atoms at a temperature ranging from 0 to 160° C., and thereafter recovering a yield of said unsaturated ethers.

6. The process of claim 5 wherein said conjugated diolefin is butadiene.

7. A process for the formation of unsaturated ethers which comprises contacting a $C_4$–$C_6$ acyclic aliphatic conjugated diolefin and an alkanol having from 1 to 8 carbon atoms in a liquid phase, said liquid phase being free of dissolved oxygen, in the presence of a catalyst system comprised of tetrakis(trialkyl phosphine) palladium wherein said alkyl is selected from the group consisting of n-butyl and n-octyl groups and a basic cocatalyst selected from the group consisting of tetraalkyl and trialkylaralkyl ammonium hydroxides and alkoxides having from 4 to 20 carbon atoms at a temperature ranging from 0 to 160° C., and thereafter recovering a yield of said unsaturated ethers.

8. The process of claim 7 wherein said conjugated diolefin is butadiene.

References Cited

UNITED STATES PATENTS

| 3,530,187 | 9/1970 | Shryne | 260—614 AA X |
| 3,499,042 | 3/1970 | Smutny | 260—614 AA |
| 3,407,224 | 10/1968 | Smutny | 260—614 AA X |
| 3,267,169 | 8/1966 | Smutny | 260—612 D X |
| 3,489,813 | 1/1970 | Dewhirst | 260—614 AA X |
| 3,574,717 | 4/1971 | Lloyd | 260—614 AA X |

OTHER REFERENCES

Takahashi et al.: Tetrahedron Letters No. 26, pp. 2451–2453, 1967.

Takahashi et al.: Bull. Chem. Soc., Japan, vol. 41, No. 1, pp. 254–255, 1968.

HOWARD F. MARS, Primary Examiner

U.S. Cl. X.R.

252—431 N, 431 P; 260—641, 683.15 D, 683.15 E